U. G. STOVER.
EVAPORATOR.
APPLICATION FILED JAN. 5, 1918.
1,285,832.
Patented Nov. 26, 1918.
2 SHEETS—SHEET 1.
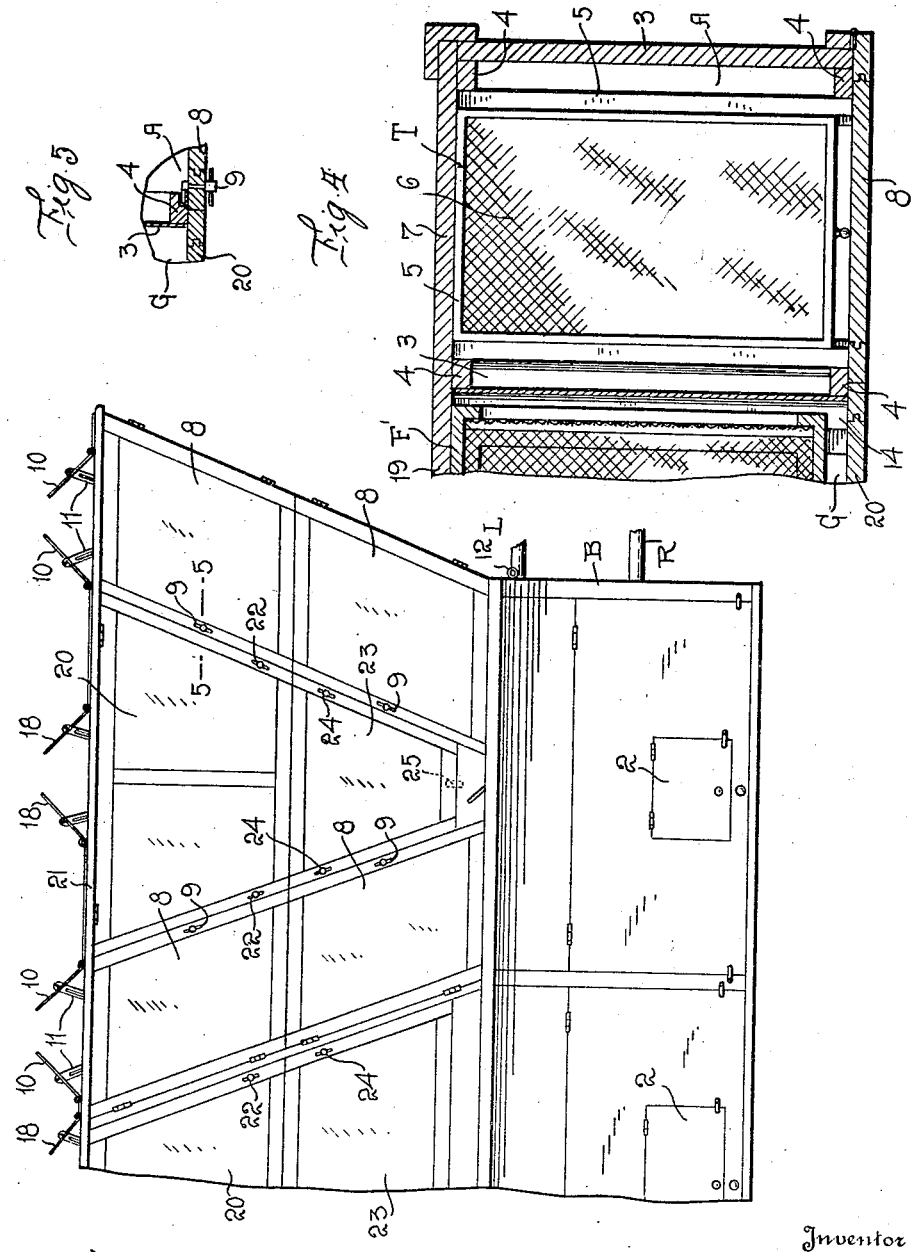
Inventor
U. G. STOVER
By Watson E. Coleman
Attorney

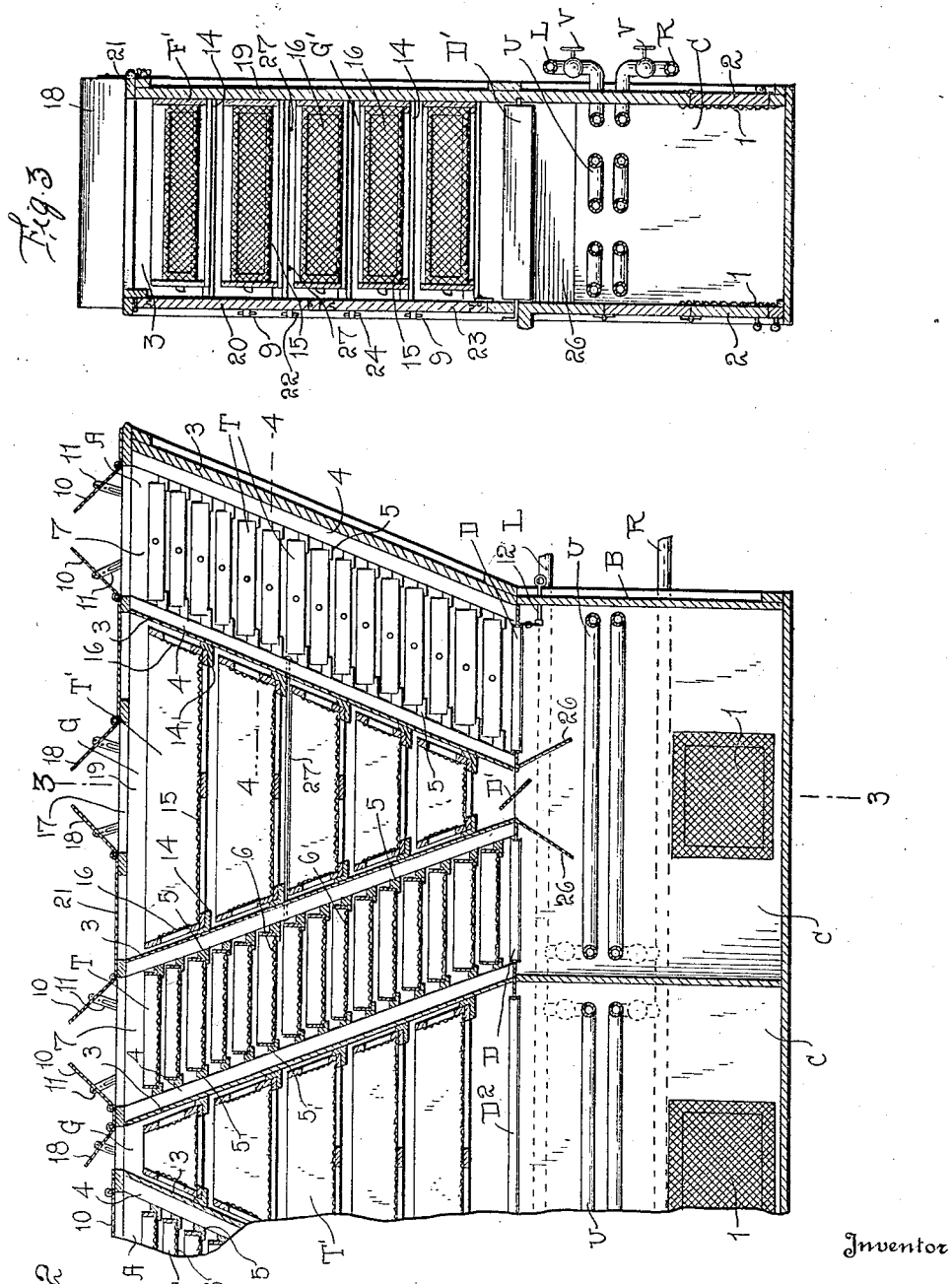

UNITED STATES PATENT OFFICE.

ULYSSES G. STOVER, OF WAYNESBORO, PENNSYLVANIA.

EVAPORATOR.

1,285,832.  Specification of Letters Patent.  Patented Nov. 26, 1918.

Application filed January 5, 1918. Serial No. 210,556.

*To all whom it may concern:*

Be it known that I, ULYSSES G. STOVER, a citizen of the United States, residing at Waynesboro, in the county of Franklin and State of Pennsylvania, have invented certain new and useful Improvements in Evaporators, of which the following is a specification, reference being had to the accompanying drawings.

This invention relates to certain improvements in evaporators and it is an object of the invention to provide a novel and improved device of this general character including a plurality of chambers and wherein one of said chambers is provided with a free circulation therethrough to carry off the moisture from the fruit or the like, while the second chamber is normally inclosed to dry the fruit or the like whereby the flavor of the fruit or the like under treatment is retained.

It is also an object of the invention to provide a novel and improved device of this general character including a plurality of chambers in communication with a source of heat and wherein each of said chambers may be heated independently of the remaining chambers in accordance with the necessities of practice.

An additional object of the invention is to provide a novel and improved device of this general character including a heating compartment having in communication therewith a plurality of chambers and wherein the communication between said compartment and each of the chambers may be independently controlled together with means whereby a circulation of heat may be had through one of the chambers in order to carry off the moisture escaping from the fruit or the like under treatment within such compartment.

A still further object of the invention is to provide a novel and improved device of this general character including two compartments arranged side by side and wherein removable trays are mounted in both of said compartments, the trays of one of the compartments being of a greater capacity than the trays in the second compartment and wherein the trays of the larger capacity are adapted to receive the contents of the smaller trays after the fruit or the like in said smaller trays has been initially subjected to the action of heat for a predetermined period of time.

The invention consists in the details of construction and in the combination and arrangement of the several parts of my improved evaporator whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in elevation illustrating an evaporator constructed in accordance with an embodiment of my invention:

Fig. 2 is a longitudinal vertical sectional view taken through the device as illustrated in Fig. 1;

Fig. 3 is a sectional view taken substantially on the line 3—3 of Fig. 2;

Fig. 4 is a sectional view taken substantially on the line 4—4 of Fig. 2; and

Fig. 5 is an enlarged fragmentary sectional view taken substantially on the line 5—5 of Fig. 1.

As disclosed in the accompanying drawings B denotes a hollow base divided into a plurality of compartments C and arranged within each of the compartments C is a heating unit U herein disclosed as a steam coil operatively connected with a lead pipe L and a return pipe R and under control of the valves V. By this arrangement it will be possible to obtain heat radiation from one of the units U independently of the other or in unison as the occasions of practice may require. Each of the compartments C has in communication therewith the screened air openings 1 each of which is under control of the door or damper 2. Cold air is adapted to enter into each of the compartments C through the openings 1 and pass upwardly through a unit U for a purpose which will hereinafter be clearly apparent.

Disposed transversely of the base B adjacent opposite ends thereof are the pairs of spaced imperforate walls 3, each pair of walls are in parallel relation and said pairs are in downwardly converging relation as particularly illustrated in Fig. 2. Secured to the opposed faces of each pair of imperforate walls 3 are the cleats 4 extending vertically and which have engaged with their inner longitudinal margins the guide strips 5 with which are engaged the removable trays T. Each of the trays T is provided with the perforate bottom 6.

Each pair of imperforate walls 3 affords therebetween a chamber or compartment A having its rear face 7 permanently closed and its front face closed by the horizontally swinging doors 8. Each of the doors 8 is maintained in closed position by a conventional type of catch 9 herein disclosed as coacting with the inner cleat 4. The upper end of each of the chambers or compartments A is open and said upper open face is under control of the plates 10 hingedly connected at opposite marginal portions of said upper open end. The plates 10 are of such length and width as to close the upper portion of the chamber or compartment A when at the limit of their downward movement. The plates 10 however are normally maintained in an open position so that the heated air passing upwardly through the chamber or compartment A will have a rapid circulation through such compartment or chamber and carry the moisture laden air out through the top. It is to be understood that the moisture is extracted or withdrawn from the fruit or the like contained within the trays T. It has been found in practice of special advantage and importance to have spaces between the guide strips 5 and the imperforate walls 3 as by this arrangement a free and comparatively rapid circulation of heated air is afforded upwardly through the chamber or compartment A. By opening or closing the plates 10 as the occasions of practice may require, it will be understood that the circulation through the chamber or compartment A may be retarded or facilitated and if it should be deemed necessary upward circulation through the chamber or compartment A may be substantially entirely prevented by causing the plates 10 to assume a completely closed position.

Coacting with each of the plates 10 is a rod 11 which serves to hold the plate 10 in its various positions.

Arranged at the bottom of each of the compartments or chambers A and controlling the entrance of the heated air therein from the hollow base B is a damper D and each of the dampers D is adapted to be moved into open and closed position in any desired manner as indicated at 12 in Figs. 1 and 2. The controlling means for the second damper D is not shown in the accompanying drawings as the same extends preferably through the rear wall of the base B.

The opposed faces of the inner walls of the compartment or chambers A are provided with the guide strips 14 to receive the removable trays T', each of the trays T' having its bottom 15 and sides 16 perforated. The trays T' are of such dimensions as to be properly received within the chamber or compartment G interposed between the chambers or compartments A. The trays T' are of a capacity greater than the capacity of each of the trays T which trays T are of a shallow type. After the fruit or the like has been initially subjected to the heated air within the chambers A, the trays T are emptied into the trays T'. The chamber G is maintained substantially sealed although the heated air may pass through an opening 17 in the top thereof. The opening 17 however is under control of the swinging plate 18. The rear wall 19 of the chamber G is permanently closed while the front face thereof has its upper portion closed by the vertically swinging door 20 hingedly engaged with the top 21 of the device. The door 20 is maintained in closed position by the fastening members 22 of any desired type and which coact with the adjacent cleats 3. The lower portion of the front face of the chamber or compartment G is adapted to be closed by the removable panel 22 which is held in applied position by a conventional type of fasteners 24 coacting with the adjacent cleats 3 and through the medium of a dowel 25 as indicated by dotted lines in Fig. 1. The bottom of the chamber G is in communication with a compartment or chamber C and the flow of heated air upwardly into said compartment G is under control of a damper $D^1$ or $D^2$. The damper $D^1$ is of a butterfly type while the damper $D^2$ is of a character which best meets the requirements of practice. The type of damper employed in connection with the chamber or compartment G depends upon the formation of said chamber. As herein embodied the device is disclosed as having a plurality of chambers or compartments A and G in battery and which results in the chambers G alternately being of an inverted configuration.

When the lower end of a chamber or compartment G is relatively restricted as illustrated at the right end portion of Fig. 2, I find it of advantage to provide the opposite longitudinal marginal portions of said openings with the downwardly diverging wings 26 extending transversely of the base B. The wings 26 serve to facilitate the entrance of the heated air into the compartment G.

It has also been found of advantage to interpose between the inner cleats 4 of adjacent pairs of cleats the tie rods 27 which serve to prevent bulging or other derangement of the cleats incident to the weight imposed thereon by the trays T and T' and the contents thereof.

From the foregoing description, it is thought to be obvious that an evaporator constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. An evaporator comprising a hollow base, a heating unit therein, a plurality of chambers in communication with the hollow base, an independently operable damper coacting with each of the chambers for controlling the communication thereof with the hollow base, removable trays arranged within the chambers, alternate chambers being arranged vertically on reversely directed inclinations.

2. An evaporator comprising a hollow base, a heating unit therein, a plurality of chambers in communication with the hollow base, an independently operable damper coacting with each of the chambers for controlling the communication thereof with the hollow base, removable trays arranged within the chambers, alternate chambers being arranged vertically on reversely directed inclinations, the trays in the chambers between the alternate chambers being of a capacity greater than the trays within said inclined chambers.

3. An evaporator comprising two chambers, a heating unit common to both of the chambers, guide strips supported by opposed walls of one of the chambers and spaced therefrom, trays removably engaged with said guide strips, and removable trays insertible within the second chamber, the capacity of each of the last named trays being greater than the capacity of each of the first named trays.

4. An evaporator comprising two chambers, a heating unit common to both of the chambers, guide strips supported by opposed walls of one of the chambers and spaced therefrom, trays removably engaged with said guide strips, and removable trays insertible within the second chamber, the capacity of each of the last named trays being greater than the capacity of each of the first named trays, the upper and lower ends of the chambers being open, and means for controlling the discharge through the upper open ends of the chambers.

5. An evaporator comprising two chambers, a heating unit common to both of the chambers, guide strips supported by opposed walls of one of the chambers and spaced therefrom, trays removably engaged with said guide strips, removable trays insertible within the second chamber, the capacity of each of the last named trays being greater than the capacity of each of the first named trays, the upper and lower ends of the chambers being open, and discharging wings depending from the lower portion of one of the chambers at opposed sides.

In testimony whereof I hereunto affix my signature in the presence of two witnesses.

U. G. STOVER.

Witnesses:
W. E. LAWSON,
G. E. LEWIS.

Copies of this patent may be obtained for five cents each, by addressing the "Commissioner of Patents, Washington, D. C."